(12) United States Patent
Shaffer et al.

(10) Patent No.: US 8,296,361 B1
(45) Date of Patent: Oct. 23, 2012

(54) METHOD AND SYSTEM FOR MANAGING CONFERENCE RESOURCES

(75) Inventors: Shmuel Shaffer, Palo Alto, CA (US); Steven L. Christenson, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 1300 days.

(21) Appl. No.: 10/754,963

(22) Filed: Jan. 8, 2004

(51) Int. Cl.
*G06F 15/16* (2006.01)

(52) U.S. Cl. ...................................................... 709/204

(58) Field of Classification Search .................. 709/228, 709/226, 227, 204–207; 379/202.01, 158
See application file for complete search history.

(56) References Cited

U.S. PATENT DOCUMENTS

| | | | | |
|---|---|---|---|---|
| 5,471,318 A | * | 11/1995 | Ahuja et al. | 358/400 |
| 5,483,587 A | | 1/1996 | Hogan et al. | 379/202 |
| 5,483,588 A | * | 1/1996 | Eaton et al. | 379/202.01 |
| 5,491,797 A | | 2/1996 | Thompson et al. | |
| 5,546,449 A | | 8/1996 | Hogan et al. | 379/202 |
| 5,757,781 A | * | 5/1998 | Gilman et al. | 370/260 |
| 5,903,637 A | | 5/1999 | Hogan et al. | 379/203 |
| 5,933,417 A | | 8/1999 | Rottoo | 370/260 |
| 5,951,637 A | | 9/1999 | Kuzma | |
| 5,963,913 A | | 10/1999 | Henneuse et al. | |
| 5,978,463 A | | 11/1999 | Jurkevics et al. | 379/202.01 |
| 6,016,478 A | | 1/2000 | Zhang et al. | |
| 6,038,304 A | | 3/2000 | Hart | 379/202.01 |
| 6,105,054 A | | 8/2000 | Kawashima | 709/204 |
| 6,163,692 A | * | 12/2000 | Chakrabarti et al. | 455/416 |
| 6,195,117 B1 | | 2/2001 | Miyazaki | 348/14.09 |
| 6,205,122 B1 | | 3/2001 | Sharon et al. | |
| 6,215,782 B1 | * | 4/2001 | Buskens et al. | 370/350 |
| 6,282,278 B1 | | 8/2001 | Doganata et al. | 379/202 |
| 6,310,859 B1 | * | 10/2001 | Morita et al. | 370/235 |
| 6,324,169 B1 | | 11/2001 | Roy | 370/260 |
| 6,324,517 B1 | | 11/2001 | Bingham et al. | |
| 6,377,987 B1 | | 4/2002 | Kracht | |
| 6,411,601 B1 | | 6/2002 | Shaffer et al. | 370/230 |
| 6,411,605 B1 | | 6/2002 | Vance et al. | |

(Continued)

FOREIGN PATENT DOCUMENTS

DE 1331785 * 7/2003

(Continued)

OTHER PUBLICATIONS

Internet Engineering Task Force (IETF) Internet Draft, "*SIP for Presence*," J. Rosenberg (Lucent Technologies, Bell Laboratories) and H. Schulzrinne (Columbia University), http://www.alternic.org/drafts/drafts-r-s/draft-rosenberg-sip-pip-00.txt., Nov. 13, 1998.

(Continued)

*Primary Examiner* — Chirag R Patel
(74) *Attorney, Agent, or Firm* — Baker Botts L.L.P.

(57) ABSTRACT

A method for managing conference resources includes hosting a conference between a plurality of participants using a first amount of resources. The plurality of participants use a plurality of endpoints to communicate on the conference. The method includes reserving a sufficient amount of the first amount of resources to allow a first participant of the plurality of participants to rejoin the conference when the first participant disconnects from the conference. The method also includes reclaiming the sufficient amount of resources upon one of the following: receiving an indication that the first participant will not rejoin the conference or expiration of a predetermined amount of time after the first participant disconnects from the conference.

23 Claims, 2 Drawing Sheets

U.S. PATENT DOCUMENTS

| | | |
|---|---|---|
| 6,414,635 B1 | 7/2002 | Stewart et al. |
| 6,441,605 B1 | 8/2002 | Baurand et al. ............... 324/127 |
| 6,466,252 B1 | 10/2002 | Miyazaki ...................... 370/260 |
| 6,480,830 B1 | 11/2002 | Ford et al. |
| 6,516,345 B1 | 2/2003 | Kracht |
| 6,606,305 B1 | 8/2003 | Boyle et al. ................... 370/260 |
| 6,614,450 B1 | 9/2003 | Vossler |
| 6,687,228 B1 | 2/2004 | Fichou et al. |
| 6,744,460 B1 | 6/2004 | Nimri et al. ............... 348/14.11 |
| 6,747,976 B1 | 6/2004 | Bensaou et al. |
| 6,771,661 B1 | 8/2004 | Chawla et al. |
| 6,772,436 B1 | 8/2004 | Doganata et al. ............. 725/106 |
| 6,798,753 B1 | 9/2004 | Doganata et al. ............. 370/260 |
| 6,807,563 B1 | 10/2004 | Christofferson et al. ..... 709/204 |
| 6,816,469 B1 | 11/2004 | Kung et al. |
| 6,839,417 B2 | 1/2005 | Weisman et al. ........ 379/204.01 |
| 6,870,916 B2 | 3/2005 | Henrikson et al. ....... 379/202.01 |
| 6,876,668 B1 | 4/2005 | Chawla et al. |
| 6,876,734 B1 | 4/2005 | Summers et al. ........ 379/202.01 |
| 6,986,156 B1 | 1/2006 | Rodriguez et al. |
| 7,009,970 B2 | 3/2006 | Popovich |
| 7,013,338 B1 | 3/2006 | Nag et al. |
| 7,035,230 B1 | 4/2006 | Shaffer et al. ................. 370/261 |
| 7,085,243 B2 | 8/2006 | Decker et al. ................. 370/261 |
| 7,130,620 B2 * | 10/2006 | Forman et al. ............. 455/414.2 |
| 7,213,050 B1 | 5/2007 | Shaffer et al. ................. 709/204 |
| 7,228,145 B2 * | 6/2007 | Burritt et al. .................. 455/519 |
| 7,492,729 B2 | 2/2009 | Shaffer et al. |
| 2002/0069094 A1 | 6/2002 | Bingham |
| 2002/0118688 A1 | 8/2002 | Jagannathan ................. 370/410 |
| 2002/0143600 A1 | 10/2002 | Dugan |
| 2002/0188731 A1 | 12/2002 | Potekhin et al. |
| 2003/0103075 A1 | 6/2003 | Rosselot |
| 2004/0010548 A1 | 1/2004 | Hamilton et al. ............. 709/204 |
| 2004/0044789 A1 | 3/2004 | Angel et al. |
| 2004/0105395 A1 | 6/2004 | Friedrich et al. .............. 370/261 |
| 2004/0141605 A1 * | 7/2004 | Chen et al. ............... 379/202.01 |
| 2004/0161080 A1 | 8/2004 | Digate et al. ............... 379/88.17 |
| 2005/0034079 A1 | 2/2005 | Gunasekar et al. |
| 2005/0259145 A1 | 11/2005 | Schrader |
| 2006/0045253 A1 | 3/2006 | Bieselin et al. |
| 2006/0171337 A1 | 8/2006 | Shaffer et al. |
| 2007/0067387 A1 | 3/2007 | Jain et al. |
| 2007/0121859 A1 * | 5/2007 | Smelyansky et al. ......... 379/158 |
| 2007/0133436 A1 | 6/2007 | Provino et al. |
| 2007/0133438 A1 | 6/2007 | Shaffer et al. |
| 2007/0280289 A1 | 12/2007 | Konda |
| 2008/0084984 A1 | 4/2008 | Levy et al. |
| 2008/0104171 A1 * | 5/2008 | Berberian et al. ............ 709/204 |
| 2009/0185556 A1 * | 7/2009 | Kamenetsky et al. ........ 370/352 |

FOREIGN PATENT DOCUMENTS

| | | |
|---|---|---|
| WO | WO 2004/114662 | 12/2004 |

OTHER PUBLICATIONS

PCT, International Search Report and Written Opinion (ISA/EPO) for PCT/US2006/027779, 15 pages, Jan. 2, 2007.

Cisco Systems, "*Cisco Conference Connection*", Data Sheet, Internet Publication, http://www.cisco.com/warp/public/cc/pd/unco/cvco/prodlit/confr_ds.pdf, 7 pages, Jun. 2003.

Latitude Communications, "*Meetingplace Web 4.0, Secure, cost-effective web conferencing for enterprises*", Internet Publication, http://www.latitude.com/pdfs/Web4.0.pdf, 2 pages.

U.S. Appl. No. 11/046,320, filed Jan. 28, 2005, entitled "Method and System for Reserving Resources of a Multipoint Conference," 44 pages specification, claims and abstract, 2 pages of drawings, inventors Shmuel (nmi) Shaffer et al.

U.S. Appl. No. 10/046,067, filed Jan. 28, 2005, entitled "Method and System for Reserving Facility Resources for a Conference," 42 pages specification, claims and abstract, 2 pages of drawings, inventors Shmuel (nmi) Shaffer et al.

U.S. Appl. No. 11/693,893, filed Mar. 30, 2007, entitled "Method and System for the Automatic Configuration of Conferenece Resources," 34 pages specification, claims and abstract, 2 pages of drawings, inventors David Cheng-Wei Lee et al.

Shaffer et al., U.S. Appl. No. 09/902,946, filed Jul. 11, 2001, *System and Method for Bandwidth and Conference Resource Reservation*, communication from the Patent and Trademark Office mailed Jan. 25, 2005.

Shaffer et al., U.S. Appl. No. 09/902,946, filed Jul. 11, 2001, *System and Method for Bandwidth and Conference Resource Reservation*, communication from the Patent and Trademark Office mailed Jul. 12, 2005.

Shaffer et al., U.S. Appl. No. 11/046,320, filed Jan. 28, 2005, *Method and System for Reserving Resources of a Multipoint Conference*, communication from the Patent and Trademark Office mailed Jan. 11, 2008.

Shaffer et al., U.S. Appl. No. 11/046,320, filed Jan. 28, 2005, *Method and System for Reserving Resources of a Multipoint Conference*, communication from the Patent and Trademark Office mailed Jun. 30, 2008.

PTO Office Action for U.S. Appl. No. 11/046,067, 8 pages, Jan. 30, 2009.

PTO Office Action for U.S. Appl. No. 11/046,067, 8 pages, Jul. 10, 2008.

PTO Office Action for U.S. Appl. No. 11/046,067, 8 pages, Jan. 11, 2008.

PTO Office Action for U.S. Appl. No. 11/046,067, 9 pages, Jul. 21, 2009.

PTO Office Action for U.S. Appl. No. 11/046,320 (U.S. Patent No. 7,492,729), 11 pages, Jan. 11, 2008.

PTO Office Action for U.S. Appl. No. 11/046,320 (U.S. Patent No. 7,492,729), 7 pages, Jun. 30, 2008.

PTO Office Action for U.S. Appl. No. 11/421,630; 15 pages, Nov. 26, 2008.

PTO Office Action for U.S. Appl. No. 11/421,630; 16 pages, May 13, 2009.

Dhesikan, Subha, "H.323/RSVP Synchronization for Voice and Video over IP," Cisco Systems EDCS 177305, Revision 2.0; 44 pages, 2002.

Office Action for Konda et al., U.S. Appl. No. 11/421,630, filed Jun. 1, 2006, 21 pages), Oct. 15, 2009.

Shaffer et al., U.S. Appl. No. 11/046,067, filed Jan. 28, 2005, Communication from the US Patent and Trademark Office mailed Jan. 26, 2010.

Shaffer et al., U.S. Appl. No. 11/305,522, filed Dec. 14, 2005, Communication from the US Patent and Trademark Office mailed Jan. 4, 2010.

Shaffer et al., U.S. Appl. No. 11/046,067, filed Jan. 28, 2005, Communication from the US Patent and Trademark Office (9 pages), Jul. 19, 2010.

Shaffer et al., U.S. Appl. No. 11/305,522, filed Dec. 14, 2005, Communication from the US Patent and Trademark Office; 16 pages, Jul. 9, 2010.

Shaffer et al., U.S. Appl. No. 11/046,067, filed Jan. 28, 2005, Office Action Communication from the US Patent and Trademark Office mailed Oct. 28, 2010.

Shaffer et al., U.S. Appl. No. 11/305,522, filed Dec. 14, 2005, Office Action Communication from the US Patent and Trademark Office mailed Dec. 2, 2010.

Office Action Communication from the US Patent and Trademark Office for Shaffer et al., U.S. Appl. No. 11/046,067, filed Jan. 28, 2005, Apr. 13, 2011.

Office Action Communication from the US Patent and Trademark Office for Shaffer et al., U.S. Appl. No. 11/305,522, filed Dec. 14, 2005, May 25, 2011.

Advisory Action from the US Patent and Trademark Office for Konda, U.S. Appl. No. 11/421,630, filed Jun. 1, 2006, Jan. 4, 2010.

Examiner's Answer from the US Patent and Trademark Office for Konda, U.S. Appl. No. 11/421,630, filed Jun. 1, 2006, Jun. 21, 2010.

* cited by examiner

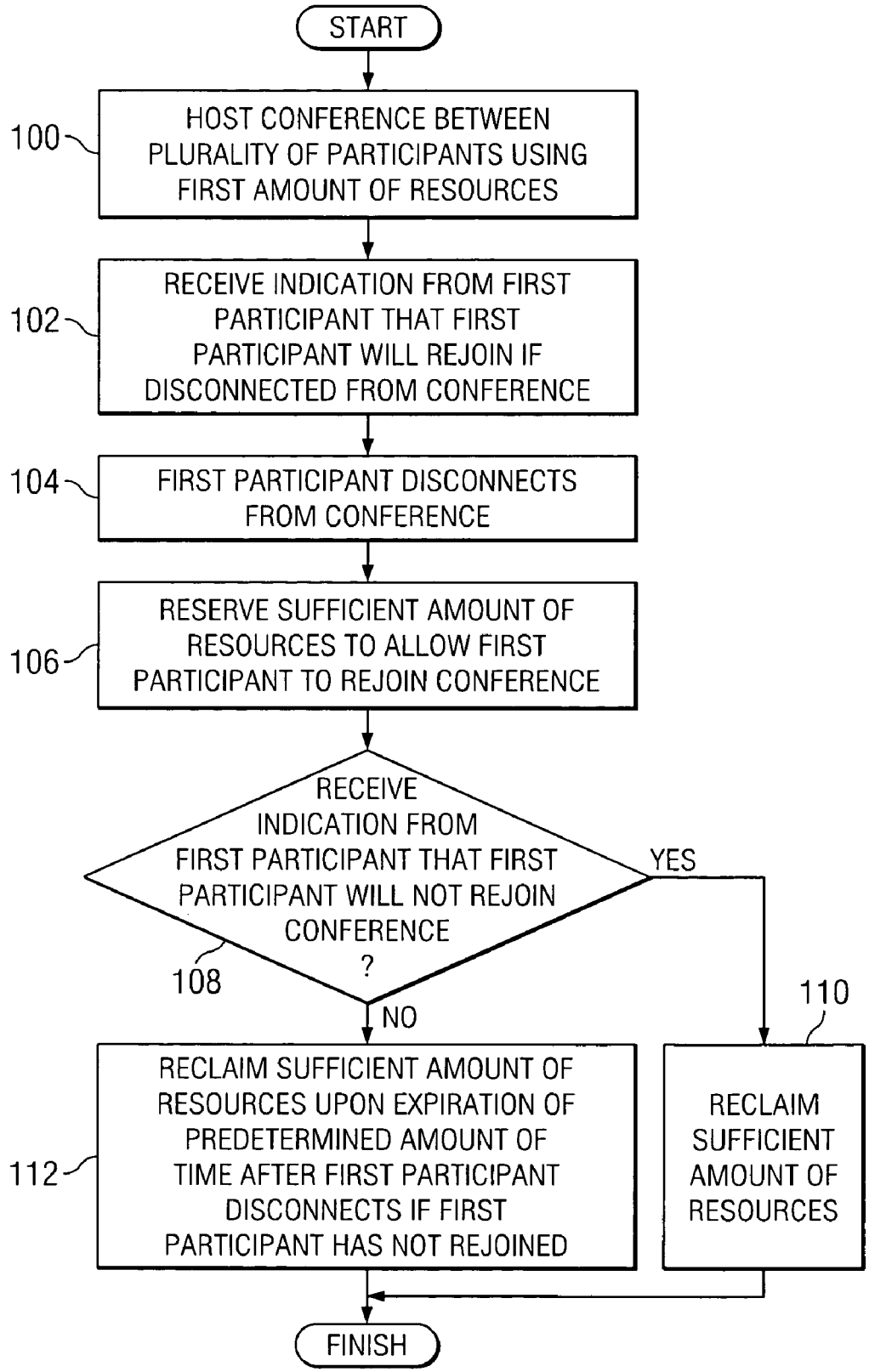

METHOD AND SYSTEM FOR MANAGING CONFERENCE RESOURCES

TECHNICAL FIELD OF THE INVENTION

The present invention relates generally to communication systems and, more particularly, to a method and system for managing conference resources.

BACKGROUND OF THE INVENTION

Historically, telecommunications have involved the transmission of voice and fax signals over a network dedicated to telecommunications, such as the Public Switch Telephone Network (PSTN) were are Private Brage Exchange (PBX). Similarly, data communications between computers have been historically transmitted on a dedicated data network, such a Local Area Network (LAN) or a Wide Area Network (WAN). Currently telecommunications and data transmissions are being merged into a integrated communication network using technology such as Voiceover Internet Protocol (VoIP). Since many LANs and WANs transmit computer data using Intranet Protocol (IP), VoIP uses this existing technology to transmit voice and fax signals by converting these signals into digital data and encapsulating the data for transmission over an IP network.

Traditional communication networks often support multipoint conferences between a number of participants using different communication devices. A multipoint conference unit (MCU) is used to couple these devices, which allows users from distributed geographic locations to participate in the conference. The conference may be audio only (e.g. teleconference) or may include video conferencing/broadcasting.

Conferencing systems generally deploy resource allocation and reclamation methods to improve the efficiency of resource utilization. That is, when participants leave a conference, their resources are returned to a pool of resources and become eligible for reuse by others. Some systems typically do not reclaim resources as participants leave a conference.

SUMMARY OF THE INVENTION

The present invention provides a method and system for managing conference resources that substantially eliminates or reduces at least some of the disadvantages and problems associated with previous methods and systems.

In accordance with a particular embodiment of the present invention, a method for managing conference resources includes hosting a conference between a plurality of participants using a first amount of resources. The plurality of participants use a plurality of endpoints to communicate on the conference. The method includes reserving a sufficient amount of the first amount of resources to allow a first participant of the plurality of participants to rejoin the conference when the first participant disconnects from the conference. The method also includes reclaiming the sufficient amount of resources upon one of the following: receiving an indication that the first participant will not rejoin the conference or expiration of a predetermined amount of time after the first participant disconnects from the conference.

The method may also include receiving an indication from the first participant that the first participant will rejoin the conference if disconnected from the conference. The indication from the first participant that the first participant will rejoin the conference may be received through one of the following: web, e-mail, dual tone multi-frequency, text chat (Instant Messaging) or spoken command via adaptive speech recognition (ASR) communication. The predetermined amount of time may comprise an amount of time specified by the first participant or by a conference administrator. The resources may comprise at least one of communication ports and DSP resources for transcoding or mixing available at a multipoint conference unit. The method may also include associating the reserved sufficient amount of the first amount of resources with the first participant using a user id, password or calling number of the first participant.

In accordance with another embodiment, a method for managing conference resources includes hosting a conference between a plurality of participants using a first amount of resources. The plurality of participants use a plurality of endpoints to communicate on the conference. The method includes reserving a sufficient amount of the first amount of resources to allow a first participant of the plurality of participants to rejoin the conference if the first participant unintentionally disconnects from the conference. The method also includes reclaiming a second amount of the first amount of resources if the first participant intentionally disconnects from the conference. The second amount of the first amount of resources are used by the first participant when participating on the conference. The first participant may be connected with the conference using a mobile phone endpoint, and a disconnection from the conference resulting from a loss of mobile phone endpoint coverage or service may comprise an unintentional disconnection from the conference.

In accordance with yet another embodiment, a method for managing conference resources includes calling a plurality of participant endpoints to establish a conference between a plurality of participants and reserving a sufficient amount of resources to allow a first participant of the plurality of participants to participate in the call if a first participant endpoint of the first participant is in a reservation state when the first participant endpoint is called. The method also includes hosting the conference between at least some of the plurality of participants using a first amount of resources. The first participant endpoint may be in a reservation state when the first participant endpoint is busy or in a do not disturb state when called. The method may also include reclaiming the sufficient amount of resources if the first participant does not join the conference in a predetermined amount of time.

Technical advantages of particular embodiments of the present invention include a method for managing conference resources that utilizes "save my spot" functionality for conference participants. Upon request of a conference participant to save the participant's spot in a conference and subsequent disconnection from the conference by the participant, conference resources such as bandwidth reservation(s), communication ports and DSP resources for transcoding or mixing may be reserved so that the participant may later rejoin the conference. Such resource reservation may also occur upon request of a participant who may arrive late to a conference. The resource reservation prevents the resources from being reclaimed for use in other conferences or for other needs. If the participant chooses not to rejoin the conference and indicates such desire, the reserved resources may be reclaimed for use in other conferences. Accordingly, quality of service for conferences is increased as resources may be allocated and utilized according to dynamic need changes.

Thus, particular embodiments provide improved resource utilization since resources may be reserved or reclaimed based on desires or needs of current participants, as such desires or needs are communicated to a conference entity. Moreover, likelihood of losing a conference or losing key conference participants as a result of resource reclamation is reduced, and participants are able to rejoin a conference as desired.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which:

FIG. 3 illustrates a method for managing conference resources, in accordance with a particular embodiment of the present invention.

DETAILED DESCRIPTION OF THE INVENTION

Figure 1:
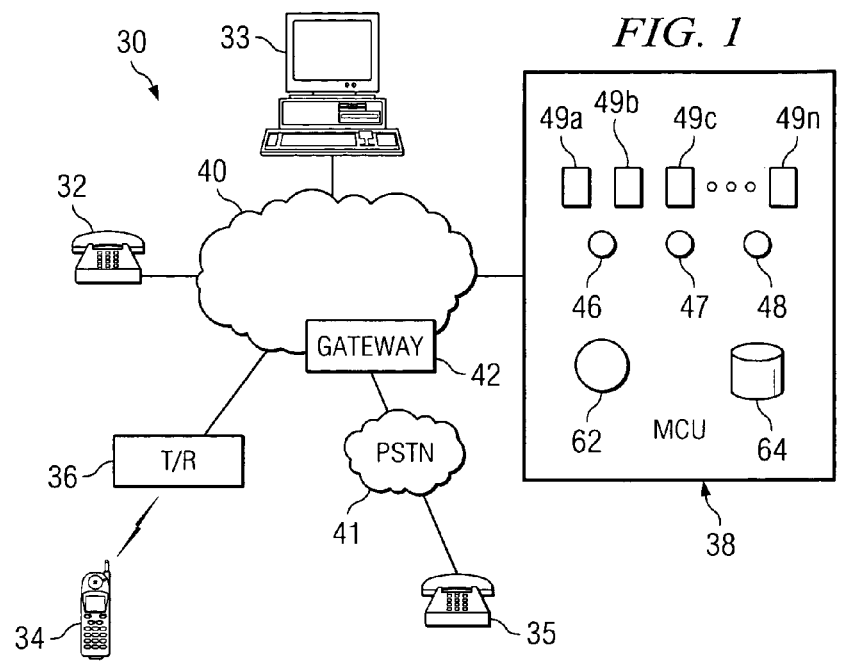
FIG. 1 illustrates a communication system with a plurality of endpoints and a multipoint conference unit, in accordance with a particular embodiment of the present invention.

FIG. 1 illustrates a communication system 30 including a plurality of endpoints 32-35 having the ability to establish communication sessions with each other and/or a multipoint conference unit (MCU) 38. Such communication sessions may be established using communication networks 40, 41 and/or additional endpoints, components or resources coupled with communication networks 40 or 41. MCU 38 hosts, or accommodates, multipoint conferences between and among endpoints 32-35. An MCU or other entity may be considered to be hosting a conference if it is one or more of the components that accommodates or otherwise provides conference resources to facilitate the conference. MCU 38 includes a plurality of digital signal processors (DSPs) 46-48 and a plurality of communication ports 49a-49n. In particular embodiments, MCU 38 may include software functioning as a DSP on a general purpose central processing unit.

In accordance with the present invention, systems and methods are provided that utilize "save my spot" functionality for conference participants. Upon request of a conference participant to save the participant's spot in a conference and subsequent disconnection of the participant from the conference, conference resources such as communication ports and DSP or other processing resources for transcoding or mixing may be reserved so that the participant may later rejoin the conference. Such resource reservation prevents the resources from being reclaimed for use in other conferences or for other needs. If the participant chooses not to rejoin the conference and indicates such desire, the reserved resources may be reclaimed for use in other conferences. Accordingly, quality of service for conferences is increased as resources may be allocated and utilized according to dynamic need changes.

The multipoint conference may be a Meet Me Conference call. A Meet Me Conference call is an arrangement by which a user can dial a specific, pre-determined telephone number and enter a security access code to join a conference with other participants. The user is automatically connected to the conference through a conference bridge. Conference participants may call in at a preset time or may be directed to do so by a conference coordinator. Meet Me Conferences may be set up through a teleconferencing service provider, generally with the capability to conference thousands of participants in a single conference call. However, other types of multipoint conferences may be accommodated, within the teachings of the present invention.

Endpoints 32-35 may be any combination of hardware, software and/or encoded logic that provide communication services to a user. For example, endpoints 32-35 may include a telephone, a mobile phone, a computer running telephony software, a video monitor, a camera or any other communication hardware, software and/or encoded logic that supports the communication of packets of media using communication network 40. In the illustrated embodiment, endpoints 32-34 include an internet telephone, a personal computer and wireless handset, respectively. A wireless base station transmitter/receiver 36 couples endpoint 34 with communication network 40. Endpoints 32-35 may also include unattended or automated systems, gateways, other intermediate components or other devices that can establish media sessions. Although FIG. 1 illustrates four endpoints 32-35, communication system 30 contemplates any number and arrangement of endpoints 32-35 for communicating media. For example, the described technologies and techniques for establishing a communication session between or among endpoints 32-35 may be operable to establish a multipoint conference between more than two endpoints 32-35.

MCU 38 may include any bridging or switching device used in support of multipoint conferencing, including videoconferencing. In various embodiments, MCU 38 may include hardware, software, software embodied in a tangible computer readable medium, and/or embedded logic. MCU 38 may be configured to support any number of conference endpoints communicating on any number of conferences, simultaneously. MCU 38 may be in the form of customer provided equipment (CPE, e.g., beyond the network interface) or may be embedded in a wide area network (WAN). Examples of multipoint conference unit standards are defined in ITU-T H.323, with T.120 describing generic conference control functions.

In the illustrated embodiment, MCU 38 includes a processor 62 and memory 64. Processor 62 may be a microprocessor, controller or any other suitable computing device or resource. Memory 64 may be any form of volatile or nonvolatile memory including, without limitation, magnetic media, optical media, random access memory (RAM), read only memory (ROM), removable media or any other suitable local or remote memory component. A user of communication system 30 may configure MCU 38 to accommodate a future multipoint conference, using processor 62 and memory 64. When a user or network administrator schedules or otherwise establishes a multipoint conference, MCU 38 prompts the administrator to identify the number of participants and a unique identifier associated with each participant.

Although specific communication networks 40 and 41 are illustrated in FIG. 1, the term "communication network" should be interpreted as generically defining any network capable of transmitting audio and/or video telecommunications signals, data and/or messages. Communication network 40 may be any computer or communication network capable of coupling two or more endpoints 32-35, for communication. In the illustrated embodiment, communication network 40 is a wide area network (WAN) that enables communication between a plurality of endpoints distributed across multiple cities and geographic regions, and communication network 41 is a public switched telephone network (PSTN). However, communication networks 40 and/or 41 may be one or more networks, including the Internet, the public switched telephone network, local area networks (LANs), global distributed networks such as intranets, extranets or other form of wireless or wireline communication networks. Generally, communication networks 40 and 41 provide for the communication of packets, cells, frames and/or other portions of information (generally referred to as packets) between and among endpoints 32-35. Communication paths for the communication of such packets may include any combination of routers, hubs, switches, gateways (e.g., gateway 42) or other hardware, software or embedded logic implementing any number of communication protocols that allow for the exchange of packets in communication system 30.

In a particular embodiment, communication network 40 employs communication protocols that allow for the addressing or identification of endpoints 32-35 coupled to communication network 40. For example, using Internet protocol (IP), each of the components coupled together by communication network 40 in communication system 30 may be identified in information directed using IP addresses. In this manner, communication network 40 may support any form and combination of point-to-point, multicast, unicast or other techniques for exchanging media packets among components in communication system 30.

Any given communication session between two of endpoints 32-35 will include the transfer of packets across one or more communication paths, that couple endpoints 32-35 and/or MCU 38 across communication network 40. Such paths may include any combination of network components, gatekeepers, call managers, routers, hubs, switches, gateways, endpoints or other hardware, software or embedded logic implementing any number of communication protocols that allow for the exchange of packets in communication system 30.

Network 40 may be directly coupled to other IP networks including, but not limited to, the Internet. Since IP networks share a common method of transmitting data, telecommunication signals may be transmitted between telephony devices located on different, but interconnected, IP networks. In addition to being coupled to other IP networks, network 40 may also be coupled to non-IP telecommunication networks through the use of gateway 42. For example, network 40 is coupled to Public Switched Telephone Network (PSTN) 41. PSTN 41 includes switching stations, central offices, mobile telephone switching offices, pager switching offices, remote terminals and other related telecommunications equipment that are located across the country.

IP networks transmit data (including voice and video data) by placing the data in packets and sending each packet individually to the selected destination. Unlike a circuit-switched network (like PSTN 41), dedicated bandwidth is not required for the duration of a call or fax transmission over IP networks. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VoIP). In the illustrated embodiment, endpoints 32-34 and MCU 38 are IP telephony devices. IP telephony devices have the capability of encapsulating a user's voice (or other inputs) into IP packets so that the voice can be transmitted over network 40. Similarly, IP telephony devices 32-34 have the capability of capturing and encapsulating video into IP packets so that the video can be transmitted over network 40. Conversely, IP telephony devices 32-34 have the capability of receiving audio or video IP packets from the network 40 and playing the audio or video data to a user.

A codec (coder/decoder) at the endpoint converts the voice, video or fax signals generated by the users of the telephony devices from analog media signals into digital form. The codec may be implemented either in software or as special-purpose hardware in the endpoints. In the case of an IP telephone, as the user speaks into the handset, the codec converts the analog voice signals into digital data. The digitally encoded data is then encapsulated into IP packets so that it can be transmitted over network 40. Conversely, another codec at the receiving endpoint converts the digital data into analog media for the users of the telephony devices. In the case of an IP telephone, digital data from IP encapsulated packets are received from the network 40. The codec at the receiving endpoint converts the digital voice, video or fax data from the network 40 into analog media to be played to the users of the telephony devices.

Gateway 42 may accomplish several functions, as converting analog or digital circuit-switched data transmitted by PSTN 41 to packetized data transmitted by network 40 and vice-versa. When voice data packets are transmitted from network 40, gateway 42 retrieves the data contained in the incoming packets and converts this digital data to the analog or digital format used by the PSTN trunk to which gateway 42 is coupled. Since the digital format for voice transmissions over an IP network is often different than the format used on the digital trunks of PSTN 41, the gateway provides conversion between these different digital formats, which is referred to as transcoding. Gateway 42 also translates between the VoIP call control system and other signaling protocols (e.g., SS7, T1, ISDN, etc.), used in PSTN 41.

For voice transmissions from PSTN 41 to network 40, the process is reversed. In a particular embodiment, gateway 42 takes the incoming voice transmission (in either analog or digital form) and converts it into the digital format used by network 40. The digital data is then encapsulated into IP packets and transmitted over network 40.

Figure 2:
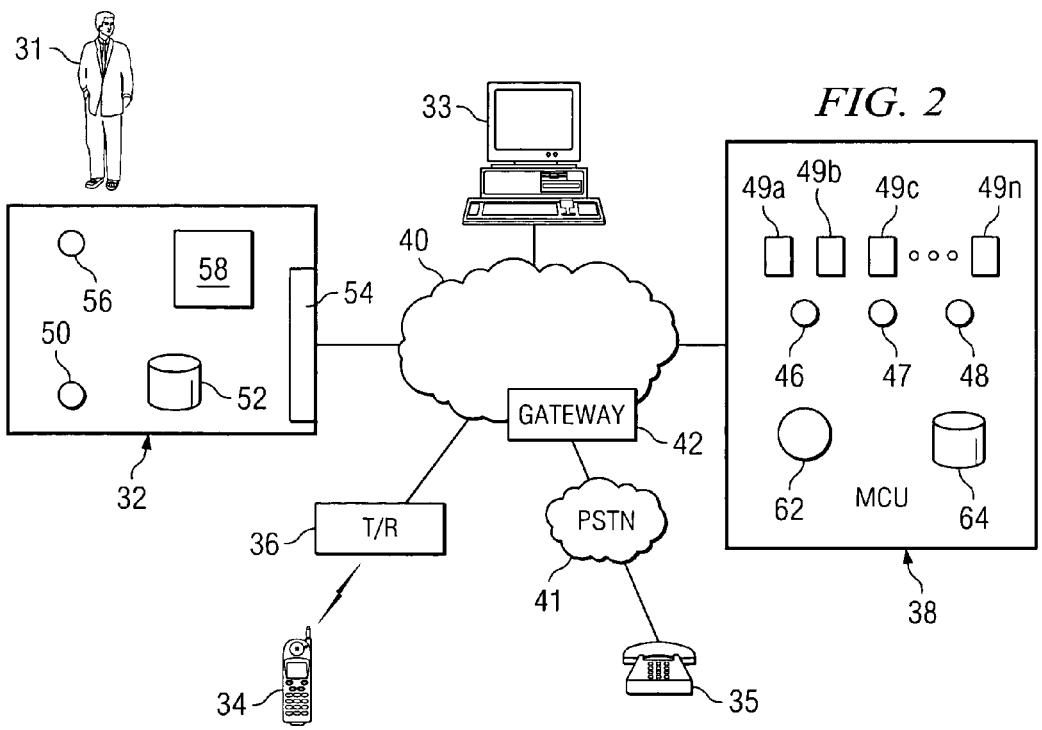
FIG. 2 illustrates a multipoint communication conference between endpoints using the multipoint conference unit of FIG. 1, in accordance with a particular embodiment of the present invention.

FIG. 2 illustrates a multipoint communication conference between participants using endpoints 32-35. The conference is hosted by MCU 38. Since endpoints 32-35 include similar components and functionality, it should be recognized that all endpoints coupled with network 40 may include the components and functionality described with regard to endpoint 32. Endpoint 32 includes a processor 50, memory 52, a network interface and a codec 56. Endpoint 32 also includes a user interface 58, which may include a microphone, video camera, speaker, keyboard, video display, LCD display and/or other device. In accordance with another embodiment, user interface 58 may be coupled with components that include a microphone, video camera, speaker, keyboard, video display and/or other device, rather than incorporating such components into endpoint 32. Participant 31 participates on a conference hosted by MCU 38 using endpoint 32. Endpoints 33-35 include similar or identical components to endpoint 32, having similar functionality.

In the illustrated embodiment, MCU 38 acts as an intermediary during the multipoint communication conference, collects all audio and/or video streams transmitted by the participants through their endpoints and distributes such streams to the participants of the multipoint conference at their endpoints. Typically, for Internet Protocol (IP) telephony applications, conferences are hosted by a MCU.

MCU 38 utilizes certain resources to effectively host each conference. For the purposes of this description and the following claims, "resources" should be understood to include any hardware or software component utilized by an MCU for hosting a conference between participants using endpoints. Conference resources may include, for example, bandwidth, communication ports and DSP resources for transcoding or mixing. Resources available to MCUs may be utilized across any number of conferences taking place at the same time between any number of endpoints. For example, if an MCU has a certain number of communication ports available for conference use, one conference may utilize some of the communication ports while another conference taking place at the same time may utilize the rest of the communication ports. If conference participants leave a conference, the communication ports and other resources utilized by those conference participants may be made available to other conferences.

Conference systems typically utilize various ways to manage resources reserved for various conferences. Some systems aggressively reclaim resources for use by other conferences or systems when a participant leaves an active conference or when participants are late in arriving. This aggressive reclamation provides good resource management for use of the resources by other conferences. However, this results in a low quality of service because of decreased service availability in that participants who leave a conference or who are late in arriving may be unable to rejoin or join the conference because there may be not be enough remaining resources reserved for the conference, particularly when resources are tight or limited with respect to a particular conference or conference system.

Some systems, such as Cisco Conference Connection (CCC), do not reclaim resources when a participant leaves an active conference. This results in higher quality of service as a result of increased service availability because resources should still be reserved and available should the participant desire to rejoin the conference. However, this can also result in poor resource management, because the resources given up by the participant who left the conference are not transferred to, or otherwise made available for, other conferences.

Other conference systems, such as Latitude's Meeting-Place™, may reclaim resources only after the last participant leaves a conference or on an otherwise periodic basis. This too results in poor resource management because resources given up by participants who have left the conference are not transferred to, or otherwise made available for use by, other conferences. Conversely, when aggressively reclaimed, resources may be prematurely reallocated thus prohibiting participants from joining or rejoining the conference.

In particular embodiments, a conference participant, such as participant 31, may use their endpoint (e.g., endpoint 32) to indicate to an MCU hosting the conference that the participant will be temporarily leaving the conference at a certain point in the future. Receiving this indication enables the MCU to reserve resources for the participant upon their return to the conference (i.e., "save the spot" of the participant). Such reservation avoids reclamation of the resources by the MCU. As used herein, reclaiming resources shall mean causing the resources to be no longer designated as required for or otherwise reserved for a particular conference. Thus, reclaimed resources may be allocated or utilized elsewhere. In particular circumstances, the indication of the participant to temporarily leave the conference can be generalized so that a conference moderator who is responsible for the conference may ask for a guarantee of resources they have requested but that may not currently be in use.

A conference participant or moderator may indicate their intent to use or re-use conference resources in any of a variety of ways, such as dual tone multi-frequency (DTMF) sequences prior to leaving a conference, DTMF sequences when they join a conference, IP Phone soft-key button (e.g., through a Cisco 7920 model phone), web interface, e-mail notification, spoken command, Instant Message (IM) interaction with other participants or with a conference entity such as an MCU or spoken command via adaptive speech recognition (ASR). In particular embodiments, such indication may be communicated to an MCU on a device other than the endpoint through which a participant will participate on a conference. For example, a participant may indicate their desire for an MCU to save the participant's spot on a conference (i.e., reserve resources sufficient to allow the participant to join or rejoin the conference) through the web on a PC even though the participant will actually join the conference using an IP phone or a mobile phone. In some embodiments, participant desires concerning joining a conference may be integrated with e-mail or calendaring programs, such as Microsoft Outlook™ for communication of such desires to an MCU hosting a conference. Such integration may include communicating selections of a possible participant regarding conference participation, such as "Accept," "Reject," "Maybe" or "Yes, but I will be late." As discussed above, intent to leave and rejoin a conference may be communicated by a participant through e-mail programs or spoken command via ASR as the participant is currently participating on the conference.

Resources reserved to allow a participant to join or rejoin a conference may be reserved until the participant expresses an intent not to join or rejoin the conference or for a specified amount of time (e.g., thirty minutes). Such amount of time may be specified by the participant, a conference moderator or an MCU administrator or may be set as a default of the MCU system.

Particular embodiments described herein may be used in a variety of conference circumstances. In addition to the situation described above wherein a single conference participant indicates a desire to temporarily leave and subsequently rejoin an active conference, the teachings herein may also be applied, for example, to a situation wherein all current participants of a conference desire to leave and rejoin the conference at a later time or from another facility. In this scenario, the last participant to leave or disconnect from the conference might otherwise trigger the closure of the conference itself. However, particular embodiments of the present invention will allow this conference to continue with its current resources, as one or more participants may indicate a desire for the resources needed for all participants to be reserved so that the conference may be reestablished at a later time or when the participants are at other facilities, as desired.

In particular embodiments, one or more participants may communicate an indication to an MCU 38 to reserve resources unless the participants explicitly indicate a desire for the resources required for their participation to be released. Such reservation indication may be communicated to the MCU at any time, such as prior to or even during a conference to which the participants are not currently connected, and using any suitable method, such as those described above with respect to a participant indicating their desire to temporarily leave and subsequently rejoin a conference. If a participant makes such an indication, then even if the participant does not call into MCU 38 to join the conference on time or leaves an active conference, resources may still be reserved for the participant. For example, in some circumstances a participant may unexpectedly leave a conference, particularly if the participant is participating on the conference through certain types of endpoints (e.g., a mobile or cell phone that unexpectedly loses service or connection with the call as a result of a poor coverage area or other problem). If the participant had made an indication to reserve conference resources for the participant's participation, then even if the participant unexpectedly gets disconnected then the resources it requires for participation will not be reclaimed.

In some embodiments, spots for participants on calls may be saved (i.e., sufficient resources may be reserved to allow participation for the participants on the conference) based on certain classes of participants, such as participants internal or external to a certain organization. For example, resources for a certain number of participants from a certain organization may be reserved until those participants either join the conference or indicate a desire to give up their reserved resources. The class of participants may be determined or identified by an MCU according to caller ID, user identification or other information. Participants also may reserve spots on a call for other participants unable to make such reservation indication for themselves (e.g., a consultant or third party).

In particular embodiments, MCU 38 may be able to determine whether the participant at an endpoint purposely leaves a conference (e.g., by pressing an "end" button or powering off a mobile phone) or whether the participant leaves a conference without choosing to do so (e.g., as a result of loss of service or connection). Such determination may be made through the difference in signaling between calls that are terminated as a result of a user intentionally hanging up the call and calls that are disconnected/dropped because of a loss of radio signal to the mobile phone. A variety of types of endpoints, such as mobile phones and IP phones, may include such differing signaling. When MCU 38 determines that a participant who leaves a conference did not do so on purpose, the MCU may reserve resources used by the participant on the conference for a predetermined amount of time so that the participant may return to the conference if desired. Thus, conference participants using certain endpoints such as mobile phones may have more latitude with respect to available resources when leaving and subsequently returning to a conference. It should be understood that participants joining or rejoining a conference according to particular embodiments may be identified when they join or rejoin through a password, a number from which the participant is calling or otherwise. In this manner, resources (e.g., an MCU port) may be reserved for a specific participant, and utilization by that participant may thus be ensured.

In some embodiments, MCU 38 may call out to participant endpoints to establish a conference. An MCU "calls" a participant endpoint when it attempts to establish a communication session with the participation endpoint through dialing a number or otherwise. In such cases, a request for resource reservation may be inferred from the state of a participant endpoint when called. For example, if MCU 38 calls endpoint 32 of conference participant 31 to establish a conference with other participants, endpoint 32 may be in a "busy" or "do not disturb" state. MCU 38 may interpret such state as a resource reservation request for participant 31 so that resources required for participation by participant 31 are not reclaimed or otherwise made available for other conferences. If endpoint 32 simply rings without answer when MCU 38 calls the endpoint, then MCU 38 may not interpret this lack of answer as a resource reservation request and may reclaim and utilize resources previously reserved for participant 31 in other conferences or as otherwise needed. In some embodiments integrated with certain applications, such as a calendaring application, an expected arrival time of a conference participant may be determined or inferred by an MCU from based on the participant's status (e.g., "busy") or scheduled appointments. Resources may be reserved by the MCU for the participant accordingly.

As described above, particular embodiments of the present invention provide improved resource utilization since resources may be reserved or reclaimed based on desires or needs of current participants, as such desires or needs are communicated to a conference entity. Moreover, likelihood of losing a conference or losing key conference participants as a result of resource reclamation is reduced, and participants are able to rejoin a conference as desired.

FIG. 3 is a flowchart illustrating a method for managing conference resources, in accordance with a particular embodiment of the present invention. The method begins at step 100 where a conference is hosted between a plurality of participants using a first amount of resources. The conference may be hosted by an MCU communicating with endpoints of the plurality of participants, and the MCU may be using communication port, DSP and other resources to host the conference. At step 102, an indication is received from a first participant of the plurality of participants that the first participant will rejoin if disconnected from the conference. The indication may be received while the first participant is participating on the conference and may be received through DTMF, e-mail, web, IM or spoken command via ASR communication.

At step 104, the first participant disconnects from the conference. Upon such disconnection, a sufficient amount of resources (e.g., communication ports, DSP resources for transcoding or mixing, etc.) are reserved at step 106 to allow the first participant to rejoin the conference. Such reservation is made based on the previous indication by the first participant that the first participant will rejoin the conference. The resource reservation prevents the sufficient amount of resources from being reclaimed and used at another conference hosted by the MCU. The reserved resources may be associated with the first participant via the first participant's user ID and password. In other embodiments, the reserved resources may be associated with the first participant via the first participant's user ID and the calling number of the phone of the first participant or otherwise.

In particular embodiments, the first participant may thus rejoin the conference using the sufficient amount of resources reserved. However, if an indication is received from the first participant at step 108 that the first participant will not rejoin the conference, then the sufficient amount of resources previously reserved to allow the first participant to rejoin the conference are reclaimed in step 110. Such reclamation means that the resources are no longer designated as required, or otherwise reserved, for a particular conference and thus may be allocated or utilized elsewhere, such as by another conference. If no such indication is received that the first participant will not rejoin the conference and if the first participant has not rejoined the conference then, at step 112, the sufficient amount of resources are reclaimed upon expiration of a predetermined amount of time after the first participant disconnects from the conference. The predetermined amount of time may be specified by the first participant, by a conference administrator or by any other suitable user or method.

Some of the steps illustrated in FIG. 3 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within an MCU and participant endpoints, these elements may be combined, rearranged or positioned in order to accommodate particular routing architectures or needs. In addition, any of these elements may be provided as separate external components to an MCU or a participant endpoint where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for managing conference resources, comprising:
   hosting a conference between a plurality of participants using a first amount of resources, the plurality of participants using a plurality of endpoints to communicate on the conference;
   reserving a sufficient amount of the first amount of resources to allow a first participant of the plurality of participants to rejoin the conference when the first participant disconnects from the conference; and
   reclaiming the sufficient amount of resources upon the following:
      receiving, after the first participant disconnects from the conference, an indication from the first participant that the first participant will not rejoin the conference.

2. The method of claim 1, further comprising receiving an indication from the first participant that the first participant will rejoin the conference if disconnected from the conference.

3. The method of claim 2, wherein the indication from the first participant that the first participant will not rejoin the conference is received through one of the following: web, e-mail, dual tone multi-frequency or spoken command via adaptive speech recognition (ASR) communication.

4. The method of claim 1, wherein the resources comprise at least one of bandwidth, communication ports and DSP resources for transcoding or mixing available at a multipoint conference unit.

5. The method of claim 1, further comprising associating the reserved sufficient amount of the first amount of resources with the first participant using a user id, password or calling number of the first participant.

6. A system for managing conference resources, comprising:
   a multipoint conference unit operable to host a conference between a plurality of participants using a first amount of resources;
   a plurality of participant endpoints coupled to each other and to the multipoint conference unit, the plurality of participant endpoints used by the plurality of participants to communicate on the conference; and
   the multipoint conference unit comprising a processor operable to:
      reserve a sufficient amount of the first amount of resources to allow a first participant of the plurality of participants to rejoin the conference when the first participant disconnects from the conference; and
      reclaim the sufficient amount of the first amount of resources upon the following:
         receipt at an interface of the multipoint conference unit, after the first participant disconnects from the conference, of the multipoint conference unit of an indication from the first participant that the first participant will not rejoin the conference.

7. The system of claim 6, wherein the interface is operable to receive an indication from the first participant that the first participant will rejoin the conference if disconnected from the conference.

8. The system of claim 7, wherein the interface is operable to receive the indication that the first participant will not rejoin the conference through one of the following: web, e-mail, dual tone multi-frequency or spoken command via adaptive speech recognition (ASR) communication.

9. The system of claim 6, wherein the resources comprise at least one of bandwidth, communication ports and DSP resources for transcoding or mixing available at a multipoint conference unit.

10. The system of claim 6, wherein the processor is further operable to associate the reserved sufficient amount of the first amount of resources with the first participant using a user id, password or calling number of the first participant.

11. A system for managing conference resources, comprising:
    means for hosting a conference between a plurality of participants using a first amount of resources, the plurality of participants using a plurality of endpoints to communicate on the conference;
    means for reserving a sufficient amount of the first amount of resources to allow a first participant of the plurality of participants to rejoin the conference when the first participant disconnects from the conference; and
    means for reclaiming the sufficient amount of resources upon the following:
       receiving, after the first participant disconnects from the conference, an indication from the first participant that the first participant will not rejoin the conference.

12. The system of claim 11, further comprising means for receiving an indication from the first participant that the first participant will rejoin the conference if disconnected from the conference.

13. The system of claim 12, wherein the indication from the first participant that the first participant will not rejoin the conference is received through one of the following: web, e-mail, dual tone multi-frequency or spoken command via adaptive speech recognition (ASR) communication.

14. The system of claim 11, wherein the resources comprise at least one of bandwidth, communication ports and DSP resources for transcoding or mixing available at a multipoint conference unit.

15. The system of claim 11, further comprising means for associating the reserved sufficient amount of the first amount of resources with the first participant using a user id, password or calling number of the first participant.

16. Software embodied in a non-transitory computer readable medium, the tangible computer readable medium comprising code operable to:
    host a conference between a plurality of participants using a first amount of resources, the plurality of participants using a plurality of endpoints to communicate on the conference;
    reserve a sufficient amount of the first amount of resources to allow a first participant of the plurality of participants to rejoin the conference when the first participant disconnects from the conference; and
    reclaim the sufficient amount of resources upon the following:
       receipt, after the first participant disconnects from the conference, of an indication from the first participant that the first participant will not rejoin the conference.

17. The medium of claim 16, wherein the code is further operable to receive an indication from the first participant that the first participant will rejoin the conference if disconnected from the conference.

18. The medium of claim 17, wherein the indication from the first participant that the first participant will not rejoin the conference is received through one of the following: web, e-mail, dual tone multi-frequency or spoken command via adaptive speech recognition (ASR) communication.

19. The medium of claim 16, wherein the resources comprise at least one of bandwidth, communication ports and DSP resources for transcoding or mixing available at a multipoint conference unit.

20. The medium of claim 16, wherein the code is further operable to associate the reserved sufficient amount of the first amount of resources with the first participant using a user id, password or calling number of the first participant.

21. A method for managing conference resources, comprising:
hosting a conference between a plurality of participants using a first amount of communication ports and a second amount of DSP resources of a multipoint conference unit, the plurality of participants using a plurality of endpoints to communicate on the conference;
reserving a sufficient amount of the first amount of communication ports and a sufficient amount of the second amount of DSP resources to allow a first participant of the plurality of participants to rejoin the conference when the first participant disconnects from the conference;
associating the reserved sufficient amount of the first amount of communication ports and the reserved sufficient amount of the second amount of DSP resources with the first participant using a user id, password or calling number of the first participant; and
reclaiming for use by another conference the reserved sufficient amount of the first amount of communication ports and the reserved sufficient amount of the second amount of DSP resources upon the following:
receiving, after the first participant disconnects from the conference, an indication from the first participant that the first participant will not rejoin the conference.

22. A system for managing conference resources, comprising:
a multipoint conference unit operable to host a conference between a plurality of participants using a first amount of communication ports and a second amount of DSP resources of the multipoint conference unit, the plurality of participants using a plurality of endpoints to communicate on the conference;
the multipoint conference unit comprising a processor operable to:
reserve a sufficient amount of the first amount of communication ports and a sufficient amount of the second amount of DSP resources to allow a first participant of the plurality of participants to rejoin the conference when the first participant disconnects from the conference;
associate the reserved sufficient amount of the first amount of communication ports and the reserved sufficient amount of the second amount of DSP resources with the first participant using a user id, password or calling number of the first participant; and
reclaim for use by another conference the reserved sufficient amount of the first amount of communication ports and the reserved sufficient amount of the second amount of DSP resources upon the following:
receiving, after the first participant disconnects from the conference, an indication from the first participant that the first participant will not rejoin the conference.

23. Software embodied in a non-transitory computer readable medium, the tangible computer readable medium comprising code operable to
host a conference between a plurality of participants using a first amount of communication ports and a second amount of DSP resources of a multipoint conference unit, the plurality of participants using a plurality of endpoints to communicate on the conference;
reserve a sufficient amount of the first amount of communication ports and a sufficient amount of the second amount of DSP resources to allow a first participant of the plurality of participants to rejoin the conference when the first participant disconnects from the conference;
associate the reserved sufficient amount of the first amount of communication ports and the reserved sufficient amount of the second amount of DSP resources with the first participant using a user id, password or calling number of the first participant; and
reclaim for use by another conference the reserved sufficient amount of the first amount of communication ports and the reserved sufficient amount of the second amount of DSP resources upon the following:
receive, after the first participant disconnects from the conference, an indication from the first participant that the first participant will not rejoin the conference.

* * * * *